Patented Aug. 20, 1946

2,406,249

UNITED STATES PATENT OFFICE 2,406,249

SALVAGE FROM FISH VISCERA

Ivan A. Parfentjev, Nanuet, N. Y.

No Drawing. Application November 25, 1943,
Serial No. 511,704

16 Claims. (Cl. 99—11)

This invention relates to the recovery of valuable materials from fish viscera and tissues. More particularly, it relates to the separation of vitamins from these sources.

This application is a continuation-in-part of my application Serial No. 448,648 filed June 26, 1942.

In the commercial processing of food fish for the market, the entrails are usually discarded or, at best, are converted into low-grade fish meal. With some of the larger fish such as certain types of the shark, the liver is utilized to recover oil containing vitamin A and little or no vitamin D, but the rest of the viscera is discarded. The methods for recovering the vitamin oil from the liver are usually cumbersome and costly. The discarded viscera or entrails not only contain substantial quantities of vitamin A but are also good sources of vitamin D and some of the vitamin B components.

It is one of the objects of the present invention to provide a simple and inexpensive method for the utilization of fish viscera and tissues as a valuable source of fat-soluble and water-soluble vitamins.

It is a further object to provide a method for the recovery of the vitamins from fish viscera and the like by means which will preserve such vitamins.

It is a still further object to provide a method for the treatment of fish viscera and the like which is sufficiently simple to permit operation at the fisheries or on fishing boats and thereby to avoid shipment to special processing plants.

It is still another object to provide a process which can be applied to the separation of fats and water-soluble components from waste fish tissues containing the same.

These and other objects are attained by subjecting the raw viscera and/or tissue, in an acidified aqueous medium, to the action of an acid-acting enzyme at moderate temperatures. The process may be illustrated more specifically by the following examples.

Example 1

Fish liver is minced by means of a mechanical grinder and sufficient hydrochloric acid is added to bring the mixture to an acidity of approximately pH 1.5–2.0. Hog pepsin or its proteolytic equivalent in fish pepsin is added in an amount of about 1 part by weight of pepsin to about 1700 parts by weight of liver. This mixture is warmed to between about 90°–100° F. for about two to three hours and allowed to stand for about three days at 70°–80° F. This approximates room temperatures in the tropical regions where these operations are most likely to be carried out. The temperature is then raised again to about 98° F. and after a short time, oil will be found to be separated as a surface layer.

After digestion, the large volume of oil forming the top layer and transparent aqueous hydrolysate forming the lower layer may be separated from the solid residue by decantation or siphoning off. Oil or fat associated with the undigested residue may be recovered by a filtration operation in which the mixture of fat and undigested residue on the filter is heated to about 37–40° C. (somewhat higher for some species of fish). With sufficiently complete digestion, the oil associated with the residue filters very easily through soft filter paper. During this filtration, the undigested residue on the filter paper becomes relatively dry and this accelerates the separation of the oil from it. The filtrate, on standing, separates into two sharply defined layers with the oil floating on top of the watery solution. The oil is easily separated from the aqueous material by decantation or by the use of suitable separating devices based on the principle of a separatory funnel. The recovery of this oil by filtration through soft filter paper is a simple procedure which eliminates the necessity of adding alkali and thereby permits substantially complete recovery of oil without impairing the vitamin content. The several portions of oil and aqueous fractions recovered as described, may be combined or may be handled separately. The oils are very transparent, of pale yellow color, and form very little sediment on storage.

By the digestion of shark liver in accordance with the method described, a yield of oil was obtained which represented about 45% on the basis of the weight of the raw liver. The potency of this oil ranged from about 8000 to 10,000 I. U. of vitamin A per gram of oil. This is the same potency as is obtained commercially by the involved manufacturing processes commonly used. The liver oil obtained by the digestion process is very stable when digestion is carried out between pH 1.5 and 2.0. Several samples of such oil stored for a period of over 1 year without preservative, in white glass bottles, and opened a number of times, nevertheless showed no signs of becoming rancid. Tests carried out on the oil stored as just described, showed that the vitamin A content of the oil remained substantially constant during storage. One sample of oil, when bottled, had 8,962 I. U. of vitamin A per gram and the same oil, stored in the white glass bottles, without preservative, still had 7,584 I. U. of vitamin A per gram after 6 months. The potencies of oil set forth above were determined colorimetrically according to the Carr-Price method without saponification.

The aqueous filtrate contains several vitamin B components. After digestion of four different samples of shark liver in the same manner as just described, it was found that one cc. of the clear filtrate or hydrolysate contained the following values of vitamin B as expressed in micrograms per cc.:

| | |
|---|---|
| Riboflavin | 2.56 – 2.86 |
| Nicotinic acid | 9.75 –13.3 |
| Pantothenic acid | 1.09 – 1.68 |
| Biotin | 0.163– 0.213 |

The aqueous hydrolysate may be concentrated to a small volume or may be dried to a powder. The concentration may be carried out in a suitable vacuum drier until a semi-solid paste is obtained. By drying in open pans at about 50° C. for about 3–5 days, a substantially completely dry material may be obtained. A convenient method for obtaining a dry powder is that in which the pasty material obtained in the vacuum drying is frozen and the frozen product dried under vacuum. The pasty material contained 29.48% solids and had the following vitamin B values:

| | Micrograms per cc. |
|---|---|
| Riboflavin | 7.5 |
| Pantothenic acid | 186.2 |
| Nicotinic acid | 41.3 |

A dry powder obtained from tuna fish liver by the described method contained, per gram of powder, the following vitamin B values:

| | Micrograms |
|---|---|
| Riboflavin | 150 |
| Pantothenic acid | 12.7 |
| Nicotinic acid | 47.5 |

While the oil obtained as just described is generally clear, it has a tendency to become slightly cloudy, especially on cooling. When the oil is cooled to about 32° F., it solidifies as an opaque mass. However, I have found that the oil may be further purified by treating it with solid magnesium lactate in the proportion of about 1 to 10% by weight, based on the weight of the oil to be treated. More specifically, as illustrative, I may add 5% of the magnesium lactate powder to the oil after it has been separated by decantation or otherwise as described. The mixture is then agitated by shaking, stirring, or the like, for a short period of time and the magnesium lactate powder is removed from the oil by filtration. The oil is then found to be brilliantly clear, pale yellow in color and to have but slight odor. This oil remains clear on standing and, while it solidifies at low temperatures, when the temperature is raised the solid melts to form the clear oil.

This method may also be used on liver of other types of fish than shark, e. g., tuna, halibut, cod, bluefish, mackerel, etc. Other organs than the liver may be treated in substantially the same manner to obtain compositions containing vitamins as well as other fat-soluble components such as hormones. The viscera and livers of many small fish are impractical as sources of vitamins in the usual processes for recovery of the same but, by utilizing the present method, these organs and tissues may be treated effectively and efficiently. Furthermore, the muscle tissues of certain species of fish, such as eels, are rich in vitamin B and the like and by utilizing the present method, it is possible to recover such vitamins.

*Example 2*

Two thousand parts of old, salted tuna fish liver was ground in a meat chopper, diluted with water to about 20,000 parts and the mixture was adjusted to pH 1.5 by the addition of concentrated hydrochloric acid. Seven parts of pepsin dissolved in a small amount of water was added and digestion was carried on for two days at a temperature of about 37° C. At the end of this period some oil had separated and floated on the top of the aqueous liquid and was recovered by decantation as in Example 1. The fatty substances associated with the undigested solid residue were separated by filtering the mixture at room temperature. During the filtration, some of the oily material solidified but was melted again by heating to about 37° C. About 400 parts of crude fat were obtained. The pure oil was easily extracted from the crude fat by mixing the latter with an equal or double amount of ether, the ether solution being separated from the residue by decantation or filtration. The ether was evaporated and the yield of the oil indicated that at least 50% of the crude fat was oil, or about 10% by weight of oil based on the weight of the original salted liver. The extracted oil contained about 118,480 vitamin A units in each gram. The vitamin content of the oil obtained by the digestion method agreed very closely with that found in oil obtained by extraction methods, thus indicating that the digestion step did not cause any substantial loss of vitamin.

The aqueous filtrate or hydrolysate obtained in separating the crude fat in the first filtration was found to contain the following values of vitamin B components as expressed in micrograms per 1 cc. of filtrate:

| | |
|---|---|
| Riboflavin | 10.8 |
| Nicotinic acid | 2.4 |
| Pantothenic acid | 1.12 |
| Biotin | 0.063 |

On the basis of the original liver, these vitamin B components were present in the following amounts as expressed in milligrams per kilogram of liver:

| | |
|---|---|
| Riboflavin | 140 |
| Nicotinic acid | 31 |
| Pantothenic acid | 14 |
| Biotin | 0.8 |

*Example 3*

Fish entrails, obtained from the commercial fish-dressing process, were ground in a meat chopper and enough hydrochloric acid was added to bring the pH to about 1.8. In order to speed the digestion, one gram of pig pepsin was added for every three kilograms of entrails. Digestion was carried on at 37° C. for 1–3 days. At the end of this period, the fat and associated undigested residue were separated by filtration from the watery filtrate.

The acidity of the watery filtrate obtained after digestion of the entrails was adjusted to pH 3 to prevent acid corrosion in drying. It was then concentrated about 20 times in a vacuum dessicator until it turned to a semi-solid paste. This pasty material was dried to powder by freezing and then drying under vacuum while in the frozen state. Alternatively, the pasty material may be placed in suitable trays in a drying oven or the like and the dry product there obtained may be ground to powder. The fish meal thus obtained contained about 12% nitrogen and represented about 8–10% of the weight of raw entrails. One gram of the fish meal obtained from mackerel entrails contained 16.1 micrograms riboflavin, 80.5 micrograms pantothenic acid and 140 micrograms nicotinic acid. Fish meal similarly obtained from mixed entrails of bass, flounder, porgies, eel and weak-fish contained per gram of fish meal, 19.8 micrograms riboflavin, 21.8 micrograms pantothenic acid, and 97.0 micrograms nicotinic acid.

Instead of concentrating the watery filtrate as described, I may mix tricalcium phosphate with such filtrate in greater or lesser amounts. The phosphate will adsorb most of the vitamin-containing materials and may be separated from the water. By using larger amounts of the phosphate, a pasty mass may be formed which quickly and easily dries to a powder. Since the tricalcium phosphate is a desirable constituent for poultry foods and the like, its use in this connection serves the double function of concentration or drying and as a constituent of the poultry food. Similarly, absorbent silica or other absorbent materials may be used in place in the calcium phosphate.

The fat associated with the residue from the digestion of the entrails contains a considerable proportion of vitamins A and D and may be recovered as described by heating the residue and filtering it, while warm, through soft filter paper by which operation the oil will pass through and the undesirable residue will remain on the filter. Another method which may be used is to extract the fat from the undigested residue by the use of ether or some other suitable solvent and the solvent is then removed by distillation from the extracted oil. The oil obtained from the entrails of various types of fish vary from about 3–20% based on the weight of the raw materials. This oil varied from about 3,000 to about 13,000 U. S. P. units vitamin A per gram of oil.

The oil may be mixed with more or less of the meals obtained from the watery filtrate described to give a better product for chicken feed or the like. Alternatively, the oil may be mixed with the watery filtrate before it is dried or in one of the intermediate stages of drying.

In place of hog pepsin described in the specific examples, it is frequently more convenient to use the fish stomach juice and/or the ground stomach tissue secreting or containing pepsin, available at the fisheries. Of course, equivalent amounts of the fish pepsin are used in place of the hog pepsin. When entrails are used, they usually contain sufficient pepsin for the digestion but more may be added if necessary or desirable. Other proteolytic enzymes which are active under acid conditions may be substituted but, for most purposes, pepsin is more readily available. The acidity of the mixture during the digestion period may vary somewhat from pH 1.5 to about pH 5.0. It is desirable that a low pH be maintained during the digestion process in order to prevent bacterial action and to prevent rancidity. A pH of 1.5–2.0 represents an optimum condition for the temperatures employed. Where the pH is less acid than about 3.0 it is preferable to add an antiseptic. The acidification of the liver suspension is favorable for retaining the activity of the vitamins. Before further purification, the digested livers in the acid medium at pH 1.5–2.0 can be stored for long periods of time without the addition of preservatives.

It should be noted that the bulk of the digestion takes place at the comparatively low temperatures not exceeding about 100° F. By processing the viscera or the like at such low temperatures, higher yields of vitamins are obtained, since elevated temperatures tend to decompose the vitamins. The temperatures of 70°–80° F. are approximately equivalent to room temperatures in many of those sections where the fisheries are located and hence, by the present process, the major portion of the operation may be carried out at or not greatly above room temperatures. Naturally, this simplifies the procedure and apparatus required and is obviously highly desirable from a commercial standpoint. More specifically, there is provided a simple and inexpensive method for obtaining high-grade oil and other vitamin products at the fisheries on a large scale and in good yield. These processes are especially valuable since they salvage abundant waste materials.

The enzyme digestion process utilized herein appears to stabilize the oil in such a manner that the oil may be allowed to stand, even in clear glass containers, for long periods of time without developing rancidity or losing its vitamin potency. No preservatives are necessary with the oil obtained in accordance with the present invention. The liver oils of commerce, previously available, were of such composition that it was found necessary to store them in amber-colored or opaque containers. Even then, such oils tended to become rancid and to lose their vitamin potency so that many substances have been suggested for use as preservatives. These precautions are not necessary with oils obtained as described herein. Another advantage of the oil obtained by the digestion method is that the oil contains practically no free fatty acid.

Nutritionally, liver and other viscera proteins rank high as a source of essential amino acids. The solids recovered from the aqueous solution resulting from the digestion of fish livers are, therefore, not only a source for the vitamin B factors but they also contain substantially all the nutritionally essential amino acids originally present as constituents of the viscera proteins.

While some of the aqueous filtrates obtained from the digestion process as described above may be rather dilute as regards solids content, they may be concentrated in any known manner where due precaution is taken to avoid decomposition of the vitamin components of the solution. Vacuum concentration at low temperatures is effective and, for certain purposes, spray drying is especially convenient. Where the vitamin B content of the hydrolysate is to be used to enrich some other material, such as a chicken feed or the like, the hydrolysate may be mixed with the desired substances and the whole is then subjected to spray drying or a similar operation.

Suitable other changes and variations may be made in carrying out the invention without departing from the spirit and scope thereof as defined in the appended claims.

I claim:

1. The process which comprises preparing an aqueous suspension of comminuted fish viscera at about pH 1.5, adding a small amount of pepsin to the suspension, maintaining the suspension at temperatures between about 70°–100° F. until the oil separates and floats to the surface, removing the acid liquid from the solid residue and separately recovering the oil and a vitamin B-containing aqueous solution from the acid liquid.

2. A process of recovering vitamin-containing materials which comprises subjecting fish viscera in an aqueous suspension to the digestive action of pepsin at a pH of about 1.5 and at temperatures not substantially exceeding about 100° F. until oil separates from the aqueous suspension, and separately recovering from the acid digestion product the vitamin-containing oil and the vitamin-containing aqueous solution.

3. A process of recovering vitamin-containing materials which comprises subjecting comminuted fish viscera in an aqueous suspension to the digestive action of pepsin at about pH 1.5 and at temperatures not substantially exceeding about 100° F. for about two days, separating the acid liquid material from the solid residue, further separating the acid liquid material into an oily fraction and an aqueous fraction and drying the aqueous fraction.

4. A process of recovering vitamin-containing materials which comprises subjecting comminuted fish viscera in an aqueous suspension to the digestive action of pepsin at about pH 1.5 and at temperatures not substantially exceeding about 100° F. for about two days, removing the acid liquid from the solid residue and separately recovering vitamin-containing oil and vitamin-containing aqueous solution from the liquid.

5. A process of recovering vitamin-containing materials which comprises subjecting comminuted fish viscera in an aqueous suspension to the digestive action of pepsin at about pH 1.5 and at temperatures not substantially exceeding about 100° F. for about two days, adding alkali to adjust the pH to about 3, removing the liquid from the solid undigested residue, separately recovering vitamin-containing oil and vitamin-containing aqueous solution from the liquid, heating the solid residue resulting from the removal of the liquid to about 37° C. and subjecting the residue to a filtering operation to recover additional oil.

6. A process of recovering vitamin-containing materials which comprises subjecting comminuted fish viscera in an aqueous suspension to the digestive action of pepsin at a pH of about 1.5, increasing the pH to about 3 after such digestion, and subjecting the still acid digestion product to a separation treatment to separate vitamin-containing oil therefrom.

7. A process of recovering vitamin-containing materials which comprises subjecting comminuted fish viscera in an aqueous suspension to the digestive action of pepsin at a pH of about 1.5, increasing the pH to about 3 after such digestion, and subjecting the still acid digestion product to a separation treatment to separate vitamin-containing oil and an acid aqueous vitamin-containing extract therefrom.

8. A process of recovering both vitamin-containing oils and water soluble vitamins from fish viscera which comprises subjecting comminuted fish viscera to the digestive action of pepsin at a pH of about 1.5 and subjecting the resulting still acid digestion product to a separation treatment to remove vitamin-containing oil and a vitamin-containing aqueous solution.

9. The process according to the preceding claim in which the acid aqueous solution is subjected to a concentrating treatment to recover a concentrated vitamin product.

10. A concentrated vitamin-B containing product containing water soluble vitamins of fish viscera and water soluble peptic-digestion products of fish viscera, including acid salts of protein digestion products.

11. A dry vitamin-B containing product containing in a concentrated form water soluble vitamins of fish viscera and soluble peptic digestion products of fish viscera, including acid salts of protein digestion products.

12. A process of recovering both vitamin-containing oils and water soluble vitamins from fish entrails containing pepsin which comprises adding acid and subjecting the entrails to digestion with their contained pepsin under acid conditions and without further addition of pepsin and subjecting the still acid digestion product to a separation treatment to separate vitamin-containing oil and an acid aqueous vitamin-containing extract therefrom, which aqueous extract contains water soluble vitamins and other water soluble digestion products of the entrails including such constituents in the form of their acid salts.

13. The process of recovering both vitamin-containing oils and water-soluble vitamins from fish viscera which comprises subjecting fish viscera to the digestive action of pepsin under acid conditions and subjecting the still acid digestion product to a separation treatment to remove vitamin-containing oil and an acid aqueous vitamin-containing extract therefrom, which aqueous extract contains water soluble vitamins and other water soluble digestion products of the entrails including such constituents in the form of their acid salts.

14. The process of recovering both vitamin-containing oils and water-soluble vitamins from fish viscera which comprises subjecting fish viscera to the digestive action of pepsin under acid conditions and subjecting the still acid digestion product to a separation treatment to remove vitamin-containing oil and an acid aqueous vitamin-containing extract therefrom, which aqueous extract contains water soluble vitamins and other water soluble digestion products of the entrails including such constituents in the form of their acid salts and said separation treatment including a filtration separation of oil from the warm residue after the separation of the aqueous solution therefrom.

15. The method of recovering vitamin-containing materials from fish viscera which comprises subjecting comminuted fish viscera in an aqueous suspension to the digestive action of pepsin under acid conditions and at a temperature below that of substantial decomposition of the vitamins, removing the aqueous liquid from the solid residue and subjecting the solid residue with admixed oil to filtration after partial drying and at a temperature at which the oil is liquid to facilitate separation of oil from the solid residue.

16. A concentrated vitamin B-containing product resulting from the peptic digestion of fish viscera under acid conditions, said product being substantially free from oil and from water insoluble products of digestion and containing water soluble vitamins of fish viscera and water soluble protein digestion products of fish viscera including such products in the form of hydrochlorides.

IVAN A. PARFENTJEV.